US011249442B2

(12) United States Patent
Forsey et al.

(10) Patent No.: US 11,249,442 B2
(45) Date of Patent: Feb. 15, 2022

(54) DISPLAY SYSTEM FOR A TIMEPIECE

(71) Applicants: GFPI S.A., La Chaux-de-Fonds (CH); COMPLITIME SA, La Chaux-de-Fonds (CH)

(72) Inventors: Stephen Forsey, Les Brenets (CH); Robert Greubel, Le Locle (CH)

(73) Assignees: GFPI S.A., La Chaux-de-Fonds (CH); COMPLITIME S.A., La Chaux-de-Fonds (CH)

( * ) Notice: Subject to any disclaimer, the term of this patent is extended or adjusted under 35 U.S.C. 154(b) by 770 days.

(21) Appl. No.: 16/083,041

(22) PCT Filed: Mar. 9, 2017

(86) PCT No.: PCT/EP2017/055587
§ 371 (c)(1),
(2) Date: Sep. 7, 2018

(87) PCT Pub. No.: WO2017/157764
PCT Pub. Date: Sep. 21, 2017

(65) Prior Publication Data
US 2019/0094812 A1    Mar. 28, 2019

(30) Foreign Application Priority Data

Mar. 16, 2016  (CH) .................................... 00360/16
Mar. 16, 2016  (EP) .................................... 16160577

(51) Int. Cl.
*G04B 13/02*  (2006.01)
*G04D 3/00*  (2006.01)
(Continued)

(52) U.S. Cl.
CPC ............. *G04D 3/002* (2013.01); *F16H 55/16* (2013.01); *F16H 55/18* (2013.01); *G04B 13/027* (2013.01);
(Continued)

(58) Field of Classification Search
CPC .. G04B 13/025; G04B 13/026; G04B 13/027; G04B 13/028
See application file for complete search history.

(56) References Cited

U.S. PATENT DOCUMENTS 5,706,255 A * 1/1998 McKay ................ G02B 25/002
359/809
2005/0078561 A1    4/2005 Endo et al.
(Continued)

FOREIGN PATENT DOCUMENTS

| CH | 710675 A2 * | 7/2016 | ............. G04B 13/02 |
|---|---|---|---|
| EP | 2843482 | 3/2015 | |
| GB | 154468 | 4/1979 | |

OTHER PUBLICATIONS

Toshiyuki Horiuchi et al: "Fabrication of nickel micro-parts using liquid-crystal-display projection lithography and newly developed pattern transfer process", Microelectronic Engineering., vol. 98, Oct. 1, 2012 (Oct. 1, 2012), NL, pp. 574-577, XP055305251, ISSN: 0167-9317, DOI: 10.1016/j.mee.2012.06.017.

(Continued)

*Primary Examiner* — Edwin A. Leon
*Assistant Examiner* — Jason M Collins
(74) *Attorney, Agent, or Firm* — Duane Morris LLP; Gregory M. Lefkowitz

(57) ABSTRACT

A display system for a timepiece is disclosed. The system includes a mobile arranged to be driven by a drive source by first teeth provided on the mobile. The mobile includes second teeth including a teeth module of less than 0.05 mm, the second teeth being arranged so as to drive a display member either directly or indirectly.

13 Claims, 4 Drawing Sheets

(51) Int. Cl.
  *F16H 55/16* (2006.01)
  *F16H 55/18* (2006.01)
  *G04B 19/02* (2006.01)
  *G04B 37/00* (2006.01)
  *G04B 39/00* (2006.01)
  *G04B 35/00* (2006.01)

(52) U.S. Cl.
  CPC .......... *G04B 13/028* (2013.01); *G04B 13/025* (2013.01); *G04B 19/02* (2013.01); *G04B 35/00* (2013.01); *G04B 37/0083* (2013.01); *G04B 39/008* (2013.01)

(56) References Cited

U.S. PATENT DOCUMENTS

| | | | | |
|---|---|---|---|---|
| 2013/0333504 | A1* | 12/2013 | Klinger | F16H 55/18 74/409 |
| 2014/0269218 | A1* | 9/2014 | Herold | G04B 47/00 368/10 |
| 2015/0346686 | A1* | 12/2015 | Dubois | C03C 27/06 368/168 |
| 2016/0246263 | A1* | 8/2016 | Sagardoyburu | G04B 19/283 |

OTHER PUBLICATIONS

Horiuchi T et al: "Micro-gear fabrication using optical projection lithography on copper-clad plastic substrates and electroplating of nickel", Microelectronic Engineering, Elsevier Publishers BV., Amsterdam, NL, vol. 83, No. 4-9, Apr. 1, 2006 (Apr. 1, 2006), pp. 1316-1320, XP024955057, ISSN: 0167-9317, [retrieved on Apr. 1, 2006], DOI: 10.1016/J.MEE.2006.01.083.

Bertsch A et al: "Combining microstereolithography and thick resist UV lithography for 3D microfabrication", Micro Electro Mechanical Systems, 1998. MEMS 98. Proceedings., The Ele venth Annual International Workshop on Heidelberg, Germany Jan. 25-29, 1998, New York, NY, USA,IEEE, US, Jan. 25, 1998 (Jan. 25, 1998), pp. 18-23, XP010270154, ISBN: 978-0-7803-4412-9, DOI: 10.1109/MEMSYS.1998.659722.

* cited by examiner

DISPLAY SYSTEM FOR A TIMEPIECE

CROSS-REFERENCE TO RELATED APPLICATIONS

This application is a § 371 national stage entry of International Application No. PCT/EP2017/055587, filed Mar. 9, 2017, which claims priority to Swiss Patent Application No. 00360/16, filed Mar. 16, 2016, and European Patent Application No. 16160577.9, filed Mar. 16, 2016, the entire contents of which are incorporated herein by reference.

TECHNICAL FIELD

The present invention relates to the horology field. It more particularly relates to a display system for a timepiece.

BACKGROUND OF THE INVENTION

The trend in complicated horology is to multiply the number of mechanisms in a timepiece, and thus to multiply the number of displays associated therewith. Several manufacturers have succeeded in placing a significant number of displays on the dial of a watch, but at a certain level of complication, it becomes difficult, if not impossible, to incorporate the display of each complication on the dial and to maintain its readability. In order to resolve this problem, it is known to arrange one or several of the displays on the bottom side of the timepiece, for example like in the "GMT" timepiece by Greubel Forsey, or visible laterally through an opening formed in the middle. One example of the latter is the display of the power reserve in the "Tourbillon Orbital" timepiece by Jean Dunand. It goes without saying that displays visible on the bottom side require the timepiece to be removed from the wearer's wrist in order to view them.

These solutions doubtless provide possibilities of multiplying the number of displays in a single timepiece, but each added complication causes significant additional energy consumption. As a result, complicated watches are typically large, and include one or even several powerful barrels in order to provide enough torque to the mechanisms while retaining an acceptable running time for the user.

BRIEF DESCRIPTION OF THE INVENTION

The object of the invention is therefore to overcome the aforementioned drawbacks, and thus to allow the construction of a timepiece including additional displays with a reduced energy consumption, therefore making it possible to improve the running time of the timepiece and/or to multiply the number of displays possible.

To this end, the invention relates to a display system for a timepiece as defined in claim 1. This system comprises a wheel arranged to be driven by a motive source, such as a going barrel, an electric motor, an output of a power reserve device or a display device for the tides, phase of the moon or the like, via a first toothing comprised by said wheel.

According to the invention, the wheel comprises at least one second toothing having a toothing modulus of less than 0.05 mm, said second toothing being arranged to drive a display organ directly or indirectly. This display organ may for example be a hand, a disc, markings on a gearwheel, or any other form of display organ.

This modulus allows a significant decrease in the size of the components, and therefore a reduction in their inertia as well as of the torque necessary to drive them. A decrease in the size of the timepiece and/or multiplication in the number of additional displays is therefore possible.

Advantageously, said wheel is an escapement wheel. The second toothing being very small and therefore light, it is thus possible to display fractions of a second via a display organ that is driven continuously but which does not create excessive energy consumption or a need for excessive additional torque. Typically, such displays are limited to an application in a chronograph mechanism (a "foudroyante"), in which case the display organ is disconnected from the chronograph train when this latter is running, in order to avoid significant energy losses. The system of the invention therefore avoids this need to disconnect the display organ, and allows an indication of the fractions of a second not only in the context of a chronograph foudroyante, but also in the context of a continuous kinematic link with the going train of the base movement. Furthermore, a foudroyante can thus be implemented with a smaller number of components and gears relative to a known foudroyante mechanism.

Said second toothing can be straight, contrate, conical, or have a combined form.

Advantageously, said wheel has a third toothing also having a toothing modulus of less than 0.05 mm, the display organ being driven via a pair of pinions connected to one another by an elastic element, one of these pinions meshing with said second toothing, the other with said third toothing, the elastic element being prestressed, for example by dephasing the two pinions in order to tension the elastic element in one direction or the other. This arrangement takes up the meshing play and therefore avoids any fluttering of the display organ via an arrangement that is suitable for use in combination with such small toothings.

Advantageously, said second toothing is of one piece with said third toothing, which allows a single-piece construction facilitating the assembly of these toothings on the wheel in one operation.

Advantageously, at least said second toothing is constructed by additive manufacturing.

Advantageously, the system according to the invention can be incorporated into a timepiece that includes an optical device to permit viewing of said display organ.

Advantageously, the timepiece comprises a plurality of said systems, said optical device being arranged to be movable relative to a middle comprised by said timepiece in order to view the display organ of at least two of said systems, in particular the corresponding display organs. A single optical device can therefore be used to read the various indications, without having to arrange the display organs immediately adjacent to one another.

To this end, the optical device can be mounted in a rotating ring provided in said middle, in a sliding block mounted in a slide-way provided in said middle, in a rotary bezel mounted on said middle, or in a rotatable case back, or rotatable part of a case back, mounted on said middle.

Alternatively, the system according to the invention can be located in a removable module arranged to be placed at least partially in a housing provided in the timepiece, in particular in its middle. This has several advantages. First, the user can remove the system from the timepiece to examine it. Furthermore, a plurality of modules with different functionalities and/or aesthetic appearances can be used with the same timepiece.

In this modular approach, said motive source can be part of a movement comprised by the timepiece while said wheel is located in said removable module, said motive source being kinematically connected with said wheel when said removable module is located in said housing. Alternatively, the motive source can be integrated in said removable module, and therefore the system can be independent of the movement of the timepiece. This last alternative avoids having to use a power takeoff through the case of the timepiece, and therefore has advantages in terms of water-resistance.

The invention also relates to a method for manufacturing a display system as defined above, in which at least said second toothing is obtained via an additive manufacturing method. This allows the construction of toothings with any three-dimensional shape having the toothing moduli necessary to implement the invention.

BRIEF DESCRIPTION OF THE DRAWINGS

Other details of the invention will appear more clearly upon reading the following description, made in reference to the appended drawings, in which.

EMBODIMENTS OF THE INVENTION

Figure 1:
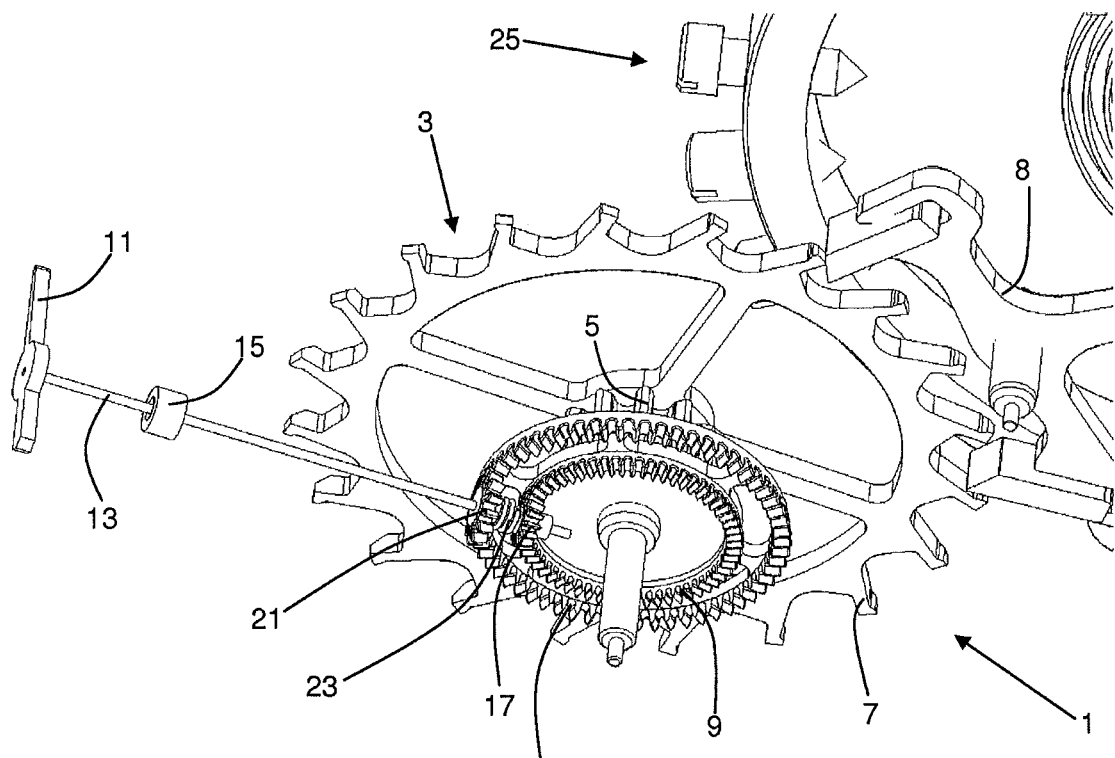
FIG. 1 is a perspective view of a display system according to the invention.

FIG. 1 illustrates a display system 1 according to the invention, in the context of a foudroyante. Nevertheless, the principle of the invention applies more broadly, for example to chronograph, date, power reserve, moon phase, tide, time in another time zone, animation, etc. displays.

The system 1 according to the invention comprises a wheel 3, comprising a first toothing 5 intended to be rotated by a motive source such as a barrel. In the case at hand, the wheel 3 is an escapement wheel 3 comprising an escapement pinion 5 as well as an escapement wheel 7 intended to interact with pallets 8 associated with a sprung balance 25 in a known manner. In another context, the wheel 3 can be a date wheel, seconds wheel (or another wheel of a going train), chronograph seconds wheel, a wheel whose position is representative of the power reserve of a barrel, or any other wheel that is appropriate to the desired indication.

The wheel 3 also comprises a second toothing 9 that is arranged to drive a display organ 11 with any form, which will be described in more detail below, but illustrated here as a hand 11 located at the end of an arbor 13 supported on an element of the watch by a bearing 15. The other end of the arbor 13 supports a first pinion 17 secured in rotation with the arbor 13 and meshing with the second toothing 9. Other forms of display organs 11 are also possible, for example discs, a marking on a gearwheel, or on a pinion, meshing with the second toothing, etc. The illustrated hand 11 has a length comprised between 1 mm and 1.5 mm, and can be better seen by the user using an optical device such as a magnifying glass integrated into the timepiece, for example like that of the "Art Piece 1" timepiece by Greubel Forsey.

The second toothing 9 makes it possible to obtain the effect which forms the core of the invention. The modulus of its toothing, i.e., the pitch of the teeth measured on its pitch circle for a given gearing, is less than 0.05 mm, preferably less than or equal to 0.035 mm, still more preferably less than or equal to 0.025 mm, still more preferably less than or equal to 0.015 mm.

Such toothings having such moduli are not typically able to be manufactured using traditional machining techniques, and therefore require manufacturing using a micro-machining method (etching of one or several plate(s) of material, LIGA technique, high-resolution additive manufacturing), which will be discussed in more detail below.

The second toothing 9 can assume any form, for example that of a traditional or conical toothing extending radially, a straight or conical contrate toothing, a helical toothing, etc.

In the illustrated example, the second toothing 9 is a conical contrate toothing, able to be manufactured using high-resolution additive manufacturing from metal, epoxy or ceramic. "Additive manufacturing" is the general term for all of the manufacturing methods using addition of material, more particularly 3D printing, in particular 3D photolithography, but other known methods can also be used. It is currently possible to manufacture parts with a precision of 1 µm or less, which makes it possible to manufacture toothings having the necessary moduli to carry out the invention. For a conventional flat toothing, well-known micro-machining techniques (masking and etching a plate, deposition, etc.) are applicable as alternatives to 3D printing. It is also possible to consider, in the future, that micro-machining methods, in particular by masking and etching, will be developed to the point that it will be possible to machine more complex shapes such as contrate toothings made from a silicon-based material (monocrystalline, polycrystalline or amorphous silicon, its oxide, carbide or nitride), diamond-based, alumina-based materials, etc.

One particular advantage of the use of 3D printing from epoxy or another polymer material is a reduction of the inertia relative to the same structure made from metal, which minimizes the increase in the inertia relative to a standard wheel 3. Nevertheless, the use of metal, ceramic or another material is also possible.

Furthermore, the polymer material is typically more flexible than metal, which provides a greater margin in the respective positioning of the elements. Indeed, if the elements can deform slightly, the positioning tolerance can be more generous. A metal with a low Young's modulus has the same effect.

In the embodiment illustrated in the figures, the display organ is a hand 11 located at the end of an arbor 13 supported on an element of the watch by a bearing 15. The other end of the arbor 13 supports a first pinion 17 secured in rotation with the arbor and meshing with the second toothing 9. Other forms of display organs 11 are also possible, for example discs, a marking on a gearwheel or on a pinion meshing with the second toothing, etc. The illustrated hand 11 has a length comprised between 1 mm and 1.5 mm, and may for example be better seen via a magnifying glass integrated into the timepiece, for example like that comprised in the "Art Piece 1" timepiece by Greubel Forsey.

Although the meshing between the second toothing 9 and the first pinion 17 suffices to drive the hand 11, in light of the small size of the gear and the rotation speed of the hand 11, the system 1 comprises means for eliminating the fluttering of the hand that will result in the case of simple driving. In other applications such as a date or a display of the power reserve, fluttering will not necessarily harm the assessment of the display by the user, and therefore a simple meshing between the second toothing 9 and the pinion 17 could be appropriate depending on the case.

In order to eliminate the aforementioned fluttering, the conventional solutions used in mechanisms of conventional size are not appropriate. Indeed, the use of a friction-spring is contra-indicated, since it increases the energy consumption of the system. Furthermore, the use of flexible teeth in the gear between the second toothing 9 and the pinion 17 is not easy, or is even impossible, because of the small size of the teeth.

The solution applied in the illustrated embodiment to react the play is described below.

Figure 2:
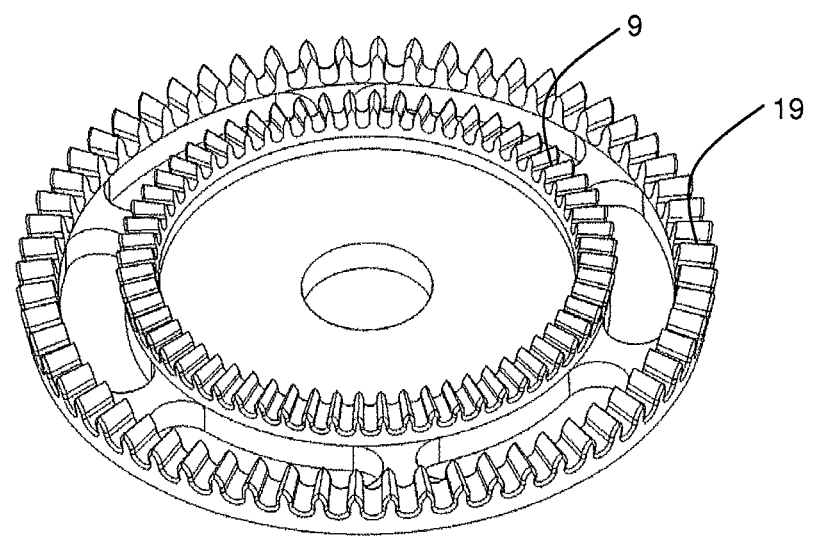
FIG. 2 is a perspective view of a gearwheel belonging to the system of FIG. 1.

A third toothing 19 is provided on the wheel 3, coaxial to the second toothing 9, these two gears comprising the same number of teeth (60 in this case), which is better visible in FIG. 2. The teeth of each of the toothings 9, 19 are mutually secured in rotation and are aligned, but may also be angularly offset relative to one another.

Figure 3:
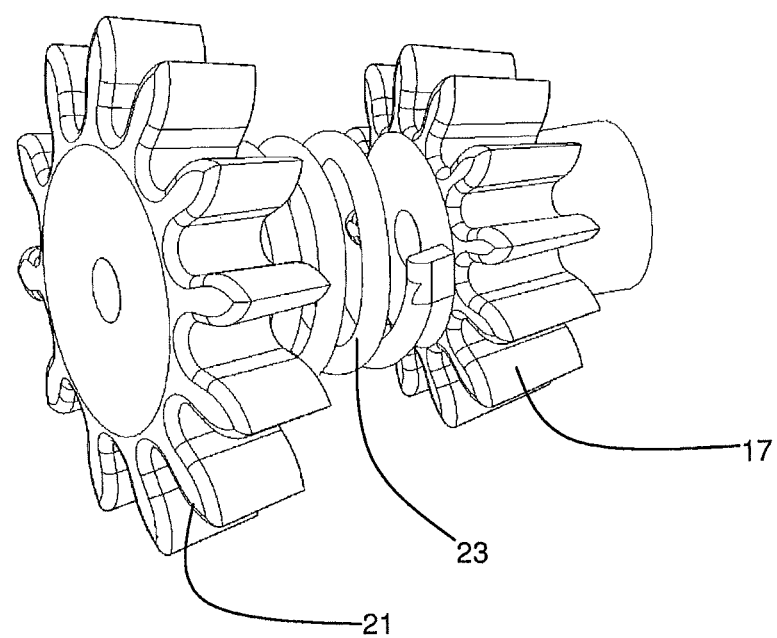
FIG. 3 is a view of a set of pinions belonging to the embodiment of FIG. 1.

As visible in FIG. 3, the first pinion 17, mentioned above, is connected to a second pinion 21 via an elastic element 23, illustrated here as a helical spring, but other forms and means are also possible. The second pinion 21 is mounted freely on the arbor 13 and, during the assembly of the system, it is angularly offset, for example being pivoted by at least one toothing pitch, relative to the first pinion 17, in order to prestress the elastic element 23 in one direction or the other. In so doing, the second pinion 21 serves as tightener pinion and the first pinion 17 is constrained to pivot so as to press against a flank of a tooth of the second toothing 9, thus taking up play and therefore avoiding the fluttering that may happen when the first pinion 17 is free to "float". If the two toothings 9, 19 are not aligned, an offset of at least one toothing pitch between the two pinions 19, 21 may also be considered, the spring constant of the elastic element being adapted accordingly.

For a regulator 25 that beats at 28,800 vibrations per hour, the illustrated escapement wheel 3, the escapement wheel 7 of which comprises 20 teeth, performs one revolution in 5 seconds. The second 9 and third 19 toothings comprise 60 teeth each, and the two pinions 17, 21 each comprise 12 teeth, and consequently the display organ performs 1 revolution per second according to steps of ⅛ revolution per vibration. A reading precision of ⅛ of a second is thus possible.

In the illustrated embodiment, the second 9 and third 19 toothings are manufactured from epoxy in a single-piece manner, and, in combination with the display organ 11, the arbor 13, the pinions 17, 21 and the elastic element 23, represent only a relative increase in inertia of 1.03 compared with the "bare" escapement wheel, and in the same manner only involve a relative torque increase of 1.118. Relative to a "traditional" foudroyante system of traditional size, the inertia of these elements is 11,000 times lower, and the torque necessary to drive them is 6.8 times lower.

Figure 4:
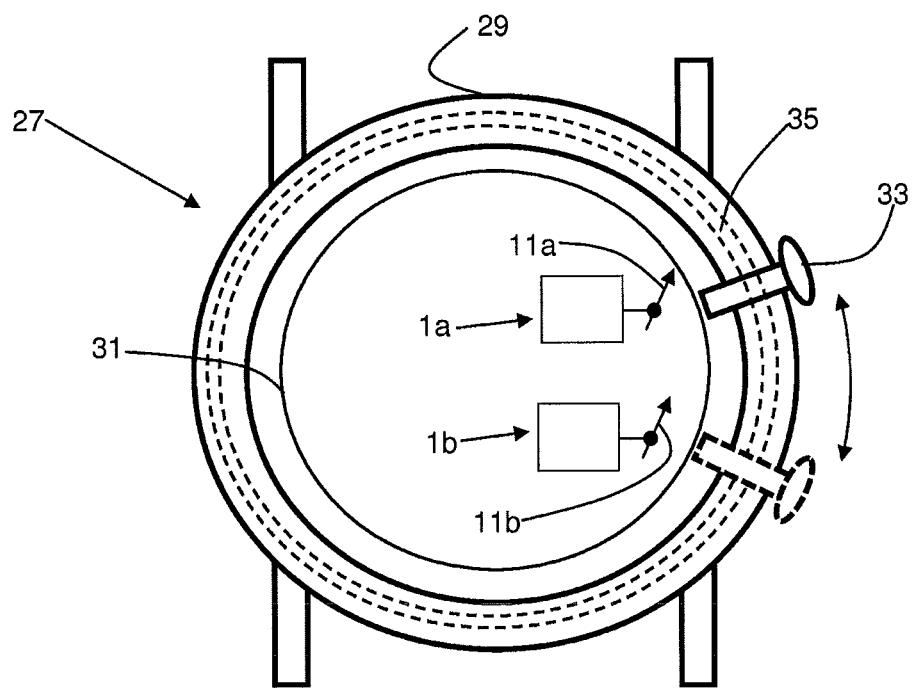
FIG. 4 is a schematic planar view of an alternative of a timepiece comprising two systems according to the invention.

FIG. 4 illustrates, in simplified schematic form, a timepiece 27 comprising a watchcase, of which only the middle 29 has been shown. Inside this case, a clockwork movement 31 is housed, associated with which are two display systems 1a, 1b according to the invention, each being provided with a respective display organ 11a, 11b. While one could arrange the two display organs 11a, 11b so that they can be viewed by a single optical device 33, such as a magnifying glass, arranged in the middle 29 or in another element of the case, or provide two individual optical devices 33 to view each display organ 11a, 11b individually, the embodiment of this figure provides a single optical device 33 supported by a rotating ring 35. This latter is arranged in the middle 29 such that the user can pivot it in order to move the optical device to be across from one or the other of the display organs 11 in order to view the corresponding display organ 11a, 11b.

Although a rotating ring 35 has advantages in terms of a certain simplicity in the provision of the sealing gaskets, other solutions are also possible. For example, the optical device 33 can be supported by a straight or curved sliding block that moves along a corresponding slide-way. Alternatively, the optical device 33 can be mounted in the case via a hinge that allows it to be pivoted around a rotation axis passing through the middle.

It is also possible to consider providing the optical device 33 in another element of the external parts of the timepiece 27, such as a rotary bezel or a rotary case back, the display organs 11a, 11b being arranged in a corresponding appropriate manner.

Further alternatively, in order to be able to view several display systems 1 located side by side in a single timepiece, it is possible to provide a magnifying glass in the form of a bar mounted rigidly in a wall of an element of the timepiece as external element, which would thus make it possible to view them all at the same time. Such a solution lends itself particularly well to a case comprising at least one straight wall.

Figure 5:
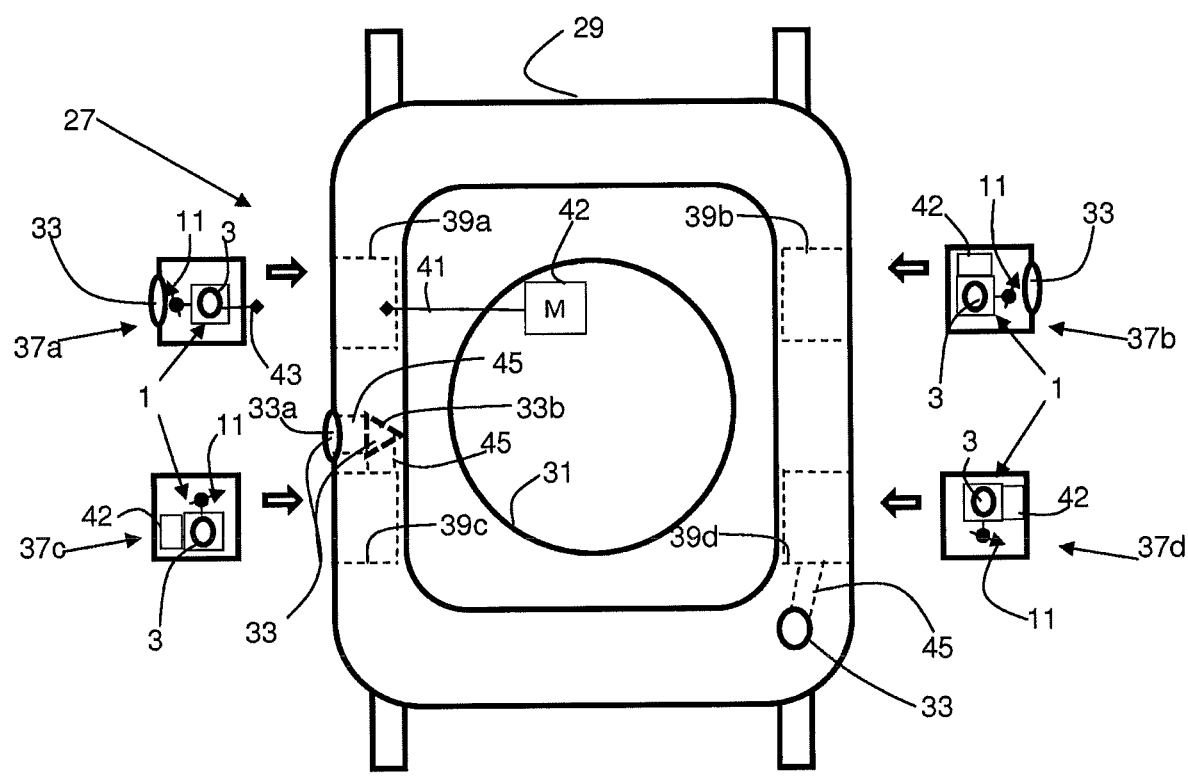
FIG. 5 is a schematic planar view of another alternative of a timepiece comprising several systems according to the invention.

FIG. 5 shows a simplified schematic illustration of another variant of a timepiece 27 comprising a case whereof only the middle 29 has been shown. This figure simultaneously shows several alternatives of modular approaches for the implementation of a display device 1 according to the invention in a timepiece 27, which can be implemented individually or in any combination.

In the first alternative, the display device 1, including its wheel 3, is provided in a removable module 37a comprising a frame inside which components of the display device 1 are housed, the module 37a being intended to be placed at least partially in a corresponding housing 39a arranged in the middle. Retention means (not illustrated) can be provided to retain the module 37a in its housing 39a. This last aspect also applies for all of the other modules 37b, 37c, 37d.

In this alternative, the motive source is integrated into the movement 31 and is part thereof. In order to transmit the motive force from a motive source 42—belonging to the movement 31—to the module 37a, a first power takeoff 41, such as a transmission axis, a shaft or the like, is provided, which emerges in the housing 39a. In order to guarantee the water-resistance of the timepiece 27, sealing gaskets (not illustrated) can be provided to make the passage of the power takeoff 41 watertight through the wall of the housing 37a.

The module 37a comprises a second power takeoff 43 suitable for interacting with the first power takeoff 41, in order to command the display organ 11 located in the module 37a. The force can be transmitted in rotation or even an axial translation or via a tilting lever that pivots around a pivot axis in order to act on the system 1 located in the module 37a. The detachable coupling between the two power takeoffs 41, 43 is shown schematically using diamonds in FIG. 5.

Furthermore, an optical device 33 can be integrated into the case of the module 37a in order to allow the user to view the display organ.

The module 37b differs from the module 37a in that it is independent of the movement, and contains its own motive source 42. Its housing 37b is therefore merely a simple hollow provided in the middle 29, without communication with the movement 31.

The module 37c is also independent of the movement, but does not have an optical device 33. In this alternative, the optical device 33 is arranged in the middle 29. This optical device 33 comprises a magnifying glass 33a located in the outer side wall of the middle 29, adjacent to an optical passage 45 leading to the inside of the housing 39c via a prism or mirror 33b that makes it possible to view the corresponding display organ 11, which is visible through an opening or a window (not illustrated) provided in the wall of the module 37c. The optical passage 45 may simply be one or several spaces, or may be any waveguide, such as a transparent prism (for example made from glass, quartz, acrylic resin or the like).

The module 37d is substantially similar to the module 37c, but is suitable for use with a different variant of an optical device 33. This optical device comprises a magnifying glass arranged in the upper face of the middle 29. If it is not possible to arrange the magnifying glass directly across from the display organ 11 when the module is in the inserted position, a prism or a mirror can be provided in the optical passage 45 like in the case of the module 37c.

The features of the various modules 37a, 37b, 37c, 37d can be combined in ways that make technical sense. In particular, the modules 37c and 37d can be provided with a kinematic link with the movement as applied in the module 37a.

Still other modifications are possible. In the case of the modules 37c and 37d, it is possible to use optical fibers as optical passages 45 in order to avoid using prisms or mirrors, and in order to be able to offset the magnifying glass of the corresponding display and thus to be able to position the magnifying glass anywhere in the middle 29.

Although the invention has been described in connection with specific embodiments, it is clear that it is in no way limited thereto and that it encompasses all technical equivalents of the described means as well as combinations thereof if they fall within the scope of the invention as defined by the claims. For example, the optical device 33 may be located inside the watch case, visible through a standard and already watertight transparent part, for example the glass. Also alternatively, the optical device 33 may be located outside the watertight part of the watch case, while being positioned to view the display organ 11 through the glass, a window or the like. These alternatives avoid having to provide additional sealing gaskets at the optical device 33. Furthermore, the toothings 5, 9 and the trains of the display system 1 can be flat, i.e., parallel to the plane of the movement, vertical, i.e., perpendicular to the plane of the movement, or inclined by another angle with respect to the plane of the movement.

The invention claimed is:

1. A display system for a timepiece, said system comprising a wheel arranged to be driven by a motive source via a first toothing comprised by said wheel, wherein said wheel comprises at least a second toothing having a toothing modulus of less than 0.05 mm, said second toothing being arranged to drive a display organ directly or indirectly, wherein said wheel is an escapement wheel.

2. The system according to claim 1, wherein said second toothing is contrate.

3. The system according to claim 1, wherein said second toothing is conical.

4. The system according to claim 1, wherein said wheel has a third toothing has a toothing modulus of less than 0.05 mm, the display organ being driven via a pair of pinions connected to one another by an elastic element, one of these pinions meshing with said second toothing, the other meshing with said third toothing, the elastic element being prestressed.

5. The system according to claim 4, wherein said second toothing is monobloc with said third toothing.

6. The system according to claim 1, wherein at least said second toothing is constructed by additive manufacturing.

7. A timepiece comprising a system according to claim 1, said timepiece comprising an optical device to be able to view said display organ.

8. The timepiece according to claim 7, comprising a plurality of said systems, said optical device being arranged to be movable relative to a middle comprised by said timepiece in order to view the display organ of at least two of said systems.

9. The timepiece according to claim 8, wherein said optical device is mounted in:
   a rotating ring provided in said middle; or
   a sliding block mounted in a slide-way provided in said middle; or
   a rotary bezel mounted on said middle; or
   a rotatable case back, or a rotatable part of a case back, mounted on said middle.

10. A timepiece comprising a clockwork movement and a system according to claim 1, said system being located in a removable module arranged to be placed at least partially in a housing provided in said timepiece.

11. The timepiece according to claim 10, wherein said motive source is part of said movement and said wheel is located in said removable module, said motive source being kinematically connected with said wheel when said removable module is located in said housing.

12. The timepiece according to claim 10, wherein said motive source is integrated in said removable module.

13. A method for manufacturing a system according to claim 1, wherein at least said second toothing is obtained via an additive manufacturing method.

* * * * *